US012732889B2

(12) United States Patent
Aksu et al.

(10) Patent No.: US 12,732,889 B2
(45) Date of Patent: Sep. 8, 2026

(54) METHOD AND SYSTEM FOR INTEGRATED ACCESS BACKHAUL SHARING AMONG CO-LOCATED RADIO SITES

(71) Applicant: Verizon Patent and Licensing Inc., Basking Ridge, NJ (US)

(72) Inventors: Arda Aksu, Lafayette, CA (US); Xin Tang, East Hanover, NJ (US); Sherali Kalim, Alpharetta, GA (US); Farook M. Hussan, Oklahoma City, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 308 days.

(21) Appl. No.: 18/446,720

(22) Filed: Aug. 9, 2023

(65) Prior Publication Data

US 2025/0056373 A1 Feb. 13, 2025

(51) Int. Cl.
*H04W 40/22* (2009.01)
*H04W 28/16* (2009.01)

(52) U.S. Cl.
CPC ........... *H04W 40/22* (2013.01); *H04W 28/16* (2013.01)

(58) Field of Classification Search
CPC .............................. H04W 40/22; H04W 28/16
See application file for complete search history.

(56) References Cited

U.S. PATENT DOCUMENTS

2012/0327779 A1* 12/2012 Gell .................... H04L 47/6275 370/235
2021/0195675 A1* 6/2021 Park ...................... H04W 88/14
2022/0086828 A1* 3/2022 Akl ........................ H04W 40/22
2022/0159565 A1* 5/2022 Park ...................... H04W 48/08
2023/0337206 A1* 10/2023 Peng ................. H04W 72/0453
2023/0397084 A1* 12/2023 Shah ..................... H04W 40/12
2024/0032004 A1* 1/2024 Yuan ..................... H04L 5/0058
2024/0179727 A1* 5/2024 Yuan ........................ H04W 8/22
2024/0413943 A1* 12/2024 Åström ................. H04L 5/0092
2025/0175290 A1* 5/2025 Noh ...................... H04L 5/0073

OTHER PUBLICATIONS

3GPP TS 38.401 version 16.3.0 Release 16, 5G; NG-RAN; Architecture description, Nov. 2020, ETSI TS 138 401, V.16.3.0, entire document (Year: 2020).*

* cited by examiner

*Primary Examiner* — Ian N Moore

(57) ABSTRACT

A method, a network device, and a non-transitory computer-readable storage medium are described in relation to an IAB backhaul sharing among co-located radio sites service. The IAB backhaul sharing among co-located radio sites service may include a traffic balancing service that performs access link bandwidth management and allocation to integrated access and backhaul (IAB) nodes based on bandwidth assessment of IAB backhaul links and bandwidth demands of IAB nodes. The service may further include a scheduling service that includes localized scheduling and load balancing at each IAB node of user traffic based on an allocated bandwidth provided by the traffic balancing service. The scheduling service may include an integrated schedule between co-located radio sites associated with the IAB node.

20 Claims, 9 Drawing Sheets

METHOD AND SYSTEM FOR INTEGRATED ACCESS BACKHAUL SHARING AMONG CO-LOCATED RADIO SITES

BACKGROUND

Development and design of networks present certain challenges from a network-side perspective and an end device perspective. For example, Next Generation (NG) wireless networks, such as Fifth Generation New Radio (5G NR) networks are being deployed and are under development. An implementation for a radio access network (RAN) deployment, transport between distributed units (DUs) and radio units (RUS), as well as centralized units (CUs) at transport access points (TAPs) and/or service access points (SAPs) include optical connections.

DETAILED DESCRIPTION

Figure 1:
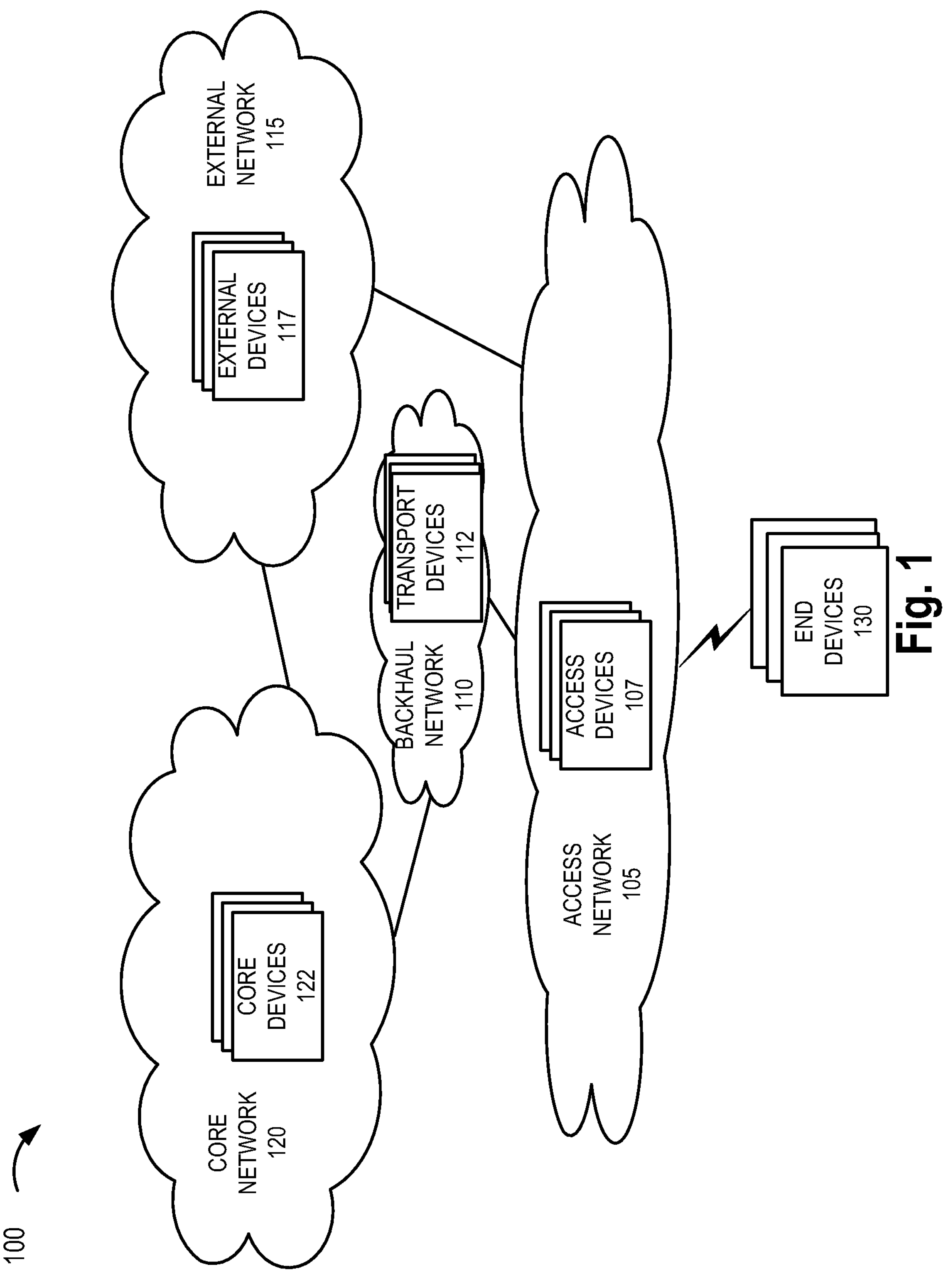
FIG. 1 is a diagram illustrating an exemplary environment in which an exemplary embodiment of an Integrated Access Backhaul (IAB) backhaul sharing among co-located radio sites service may be implemented.

The following detailed description refers to the accompanying drawings. The same reference numbers in different drawings may identify the same or similar elements. Also, the following detailed description does not limit the invention.

IAB provides a backhaul solution for radio sites where wireline backhaul may not be reachable or may be cost prohibitive. An IAB deployment may operate in millimeter wave (mmWave) bands that provide greater bandwidth in comparison to Fourth Generation (4G) or 5G frequency division duplex (FDD) low band and mid band. Current IAB solutions may enable sharing of the backhaul with geographically co-located low band and mid band radio sites. For example, a sub-6 gigahertz (GHz) next generation Node B (gNB) may be co-located with a mmWave IAB node, which backhauls both mmWave and C-band traffic to an IAB donor node with fiber point-of-presence (POP). A point-to-multipoint mmWave deployment may also enable multiple sub-6 GHz sites to be backhauled with a single mmWave IAB donor node, for example. An IAB device, as used herein, may refer to an IAB node, an IAB donor node, IAB donor DU node, IAB donor DU/RU node, or the like.

Despite the notable advantages associated with an IAB deployment, there are problems regarding how to manage end user traffic pertaining to different frequency bands or cells in a manner that optimizes the backhaul usage of a site when at least some users may have wireless service via multiple frequency bands or cells. Typical load balancing algorithms, which try to equalize the load on each frequency, cannot be employed as such algorithms assume that all radios have independent and unlimited optical fiber backhaul. For example, a first frequency (e.g., mmWave) cell of an IAB device may be allocated to only the backhaul, and all user traffic may be supported by a second frequency (e.g., sub-6 GHz) cell of a gNB. According to another example, the first frequency cell may support all the user traffic it can without limitation, and only left over capacity is used for backhauling user traffic of the second frequency cell. In either case, these backhaul sharing arrangements yield sub-optimal results.

Additionally, there are other problems regarding backhaul usage and IAB deployments. For example, with shared backhaul links, there are challenges as to how backhaul links are shared by the IAB devices along an IAB network route, path, or relay chain. Any viable solution to this problem should maximize the backhaul links utilization while supporting the bandwidth and service demands from the users at each radio site.

According to exemplary embodiments, an IAB backhaul sharing among co-located radio sites service is described. According to an exemplary embodiment, the IAB backhaul sharing among co-located radio sites service provides access link bandwidth management and allocation for a set of co-located radio sites based on a bandwidth assessment of IAB backhaul links, bandwidth demands provided by each co-located radio sites, and a maximum access bandwidth allotted to each co-located radio sites. According to an exemplary embodiment, the IAB backhaul sharing among co-located radio sites service may perform scheduling and load balancing pertaining to each radio site associated with the co-located radio sites and the IAB backhaul link based on the allotted maximum access bandwidth.

According to an exemplary embodiment, the co-located radio sites may include a wireless station (e.g., a DU and an RU) or a different set of split radio access components as described herein) and an IAB device (e.g., an RU, an IAB Mobile Termination (MT) antenna, and/or another set of radio access components, as described herein). According to an exemplary embodiment, each co-located radio sites may support two or more frequency bands, carriers, cells, or the like, as described herein.

According to an exemplary embodiment, the IAB backhaul sharing among co-located radio sites service may perform access link bandwidth management and allocation according to a centralized architecture. For example, a traffic balancer may include logic of a traffic balancing service included in the IAB backhaul sharing among co-located radio sites service. According to various exemplary embodiments, the traffic balancer may be implemented in a radio intelligent controller (RIC) device, an IAB donor DU node, an IAB donor node, or similar functioning RAN device, as described herein.

According to an exemplary embodiment, the IAB backhaul sharing among co-located radio sites service may perform scheduling and load balancing between the co-located radios. For example, each co-located radio sites or IAB device may include a scheduler. The scheduler may include logic of a scheduling service included in the IAB backhaul sharing among co-located radio sites service. For example, the scheduler may perform scheduling and load balancing regarding access to and use of the IAB backhaul based on an assigned or permitted maximum access link bandwidth provided by the traffic balancer.

According to an exemplary embodiment, the scheduler may assess backhaul bandwidth associated with an IAB link and the co-located radio sites. The scheduler may also assess capacity demands associated with the co-located radio sites. According to an exemplary embodiment, the scheduler may consider various factors pertaining to access capacity demands, such as number of users, the connections associated with the frequency bands, radio frequency conditions, spectral efficiency, and the like. Each scheduler may provide the traffic balancer with backhaul bandwidth and capacity demands. Based on the bandwidth and access demand assessment values, the traffic balancer may calculate and allocate the maximum access bandwidth for each co-located radio site. According to an exemplary embodiment, the traffic balancer may consider various factors, such as network topology, radio site efficiency, radio site cluster efficiency, bandwidth history, day and/or time, and/or other types of context information, as described herein, when calculating the maximum access bandwidth.

According to an exemplary embodiment, the scheduler may perform cross-frequency band, cross-user scheduling and load balancing based on the maximum access bandwidth allocated by the traffic balancer, as described herein. According to an exemplary embodiment, the scheduler may determine whether a total bandwidth demand exceeds the allotted maximum access bandwidth. According to an exemplary embodiment, the scheduler may determine whether traffic of users associated with a first frequency band may be reconfigured for scheduling with traffic of users associated with a second frequency band based on service level agreement (SLA) requirements, as described herein. According to an exemplary embodiment, the scheduler may suspend scheduling of traffic of lower priority users when the total bandwidth demand exceeds the allocated maximum access bandwidth.

In view of the foregoing, the IAB backhaul sharing among co-located radio sites service may improve backhaul link utilization, scheduling, and load balancing among co-located radio sites. The IAB backhaul sharing among co-located radio sites service may manage access and use of a shared backhaul for co-located radio sites.

FIG. 1 is a diagram illustrating an exemplary environment 100 in which an exemplary embodiment of an IAB backhaul sharing among co-located radio sites service may be implemented. As illustrated, environment 100 includes an access network 105, backhaul network 110, an external network 115, and a core network 120. Access network 105 includes access devices 107 (also referred to individually or generally as access device 107). Backhaul network 110 includes transport devices 112 (also referred to individually or generally as transport device 112). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks (e.g., fronthaul, mid-haul, etc.) not illustrated in FIG. 1 may be included that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the IAB backhaul sharing among co-located radio sites service may use at least one of these planes of communication.

Access network 105 may include one or multiple networks of one or multiple types and technologies. For example, access network 105 may be implemented to include a 5G RAN, a future generation RAN (e.g., a Sixth Generation (6G) RAN, a Seventh Generation (7G) RAN, or a subsequent generation RAN), a centralized-RAN (C-RAN), an Open-RAN (O-RAN), a cloud RAN, a virtualized RAN (vRAN), a self-organizing network (SON), an IAB network, and/or another type of access network. Access network 105 may include a legacy RAN (e.g., a Third Generation (3G) RAN, a 4G or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), enhanced CPRI (eCPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA NR, SA NR, future generation deployment/connectivity service, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, 5G cell, or another type of wireless architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, mmWave, below 6 GHz, above 6 GHz, higher than mmWave, C-band, licensed radio spectrum, unlicensed radio spectrum, etc.), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an eLTE evolved Node B (eNB), an eNB, a radio network controller (RNC), a RIC device, an IAB device (e.g., IAB node, IAB donor node (e.g., CU, DU, RU), IAB donor DU node, IAB donor DU/RU node, etc.), a base station controller (BSC), a remote radio head (RRH), a baseband unit (BBU), an RU, a remote radio unit (RRU), a CU, a CU-control plane (CP), a CU-user plane (UP), a DU, a small cell node (e.g., a picocell device, a femtocell device, a microcell device, a home eNB, a home gNB, etc.), an open network device (e.g., O-RAN CU (O-CU), O-RAN DU (O-DU), O-RAN RU (O-RU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access CPE (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple radio access technologies (RATs) (e.g., 4G and 5G functionality, 5G and 5.5G functionality, etc.) via soft and hard bonding based on demands and needs. According to some exemplary implementations, access device 107 may include a split access device (e.g., a CU-control plane (CP), a CU-user plane (UP), or another type of split access device), an integrated functionality, such as a CU-CP and a CU-UP, or other integrations or splits of RAN nodes. Access device 107 may be an indoor device or an outdoor device.

According to an exemplary embodiment, at least some of access devices 107 may include logic of an exemplary embodiment of the IAB backhaul sharing among co-located radio sites service. For example, a RIC device, an RNC device, a BSC device, or similar type of RAN device that may manage, control, and/or configure wireless stations of access network 107 (referred to herein simply as a RIC device) may provide a traffic balancing service of the IAB backhaul sharing among co-located radio sites service. According to another example, an IAB donor DU node may provide the traffic balancing service, as described herein. For example, an IAB donor node may be implemented to include the IAB donor DU node with a separate or an integrated CU. According to another example, an IAB donor node may include an IAB donor O-DU with a separate or an integrated O-CU. According to yet another example, the traffic balancing service may be collaboratively performed by the IAB donor DU node and the CU, for example. According to still another example, an IAB donor O-DU node may provide the traffic balancing service.

According to an exemplary embodiment, at least some access devices 107 may include logic of a scheduling service included in the IAB backhaul sharing among co-located radio sites service. For example, the IAB donor DU node, the IAB donor O-DU node, a gNB, an eNB, an eLTE eNB, a DU, an O-DU, or another type of cellular wireless station of access network 105 (referred to simply as wireless station) may provide or support the scheduling service. As described herein, the scheduling service may calculate schedules for access and use of the IAB backhaul in relation to co-located radio sites that include the wireless station. For example, the scheduling service may integrate schedules for two or more frequency bands, cells, or the like associated with user traffic of end devices 130 for access and use of the IAB backhaul. According to another example, separate schedulers may collaboratively integrate the schedule for two or more frequency bands, cells, etc. for access and use of the IAB backhaul.

Backhaul network 110 may include one or multiple networks of one or multiple types and technologies that may connect access network 105 to core network 120 and/or a backbone network (not illustrated). For example, backhaul network 110 may include a transport network (e.g., optical network, wireless network, etc.), a signaling network, and/or another type of intermediary network. Backhaul network 110 may include one or multiple types of transport devices 112, such as routing devices, relay devices, switches, platforms, aggregation devices, and/or the like.

External network 115 may include one or multiple networks of one or multiple types and technologies that provide an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. Although not illustrated, external network 115 may include one or multiple types of core devices 122, as described herein.

External devices 117 may host one or multiple types of application services. For example, the application services may pertain to broadband services, broadband access everywhere, enhanced mobile broadband (eMBB), higher user mobility, Internet of Things, extreme real-time communications (e.g., tactile Internet, augmented reality (AR), virtual reality (VR), etc.), lifeline communications, ultra-reliable communications (e.g., automated traffic control and driving, collaborative robots, health-related services, broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, navigation services, and/or other types of wireless and/or wired application services. External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a security anchor function (SEAF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, a fixed wireless device, a router, a sensor, an automated guided vehicle (AGV), an industrial robot, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

Figure 2:
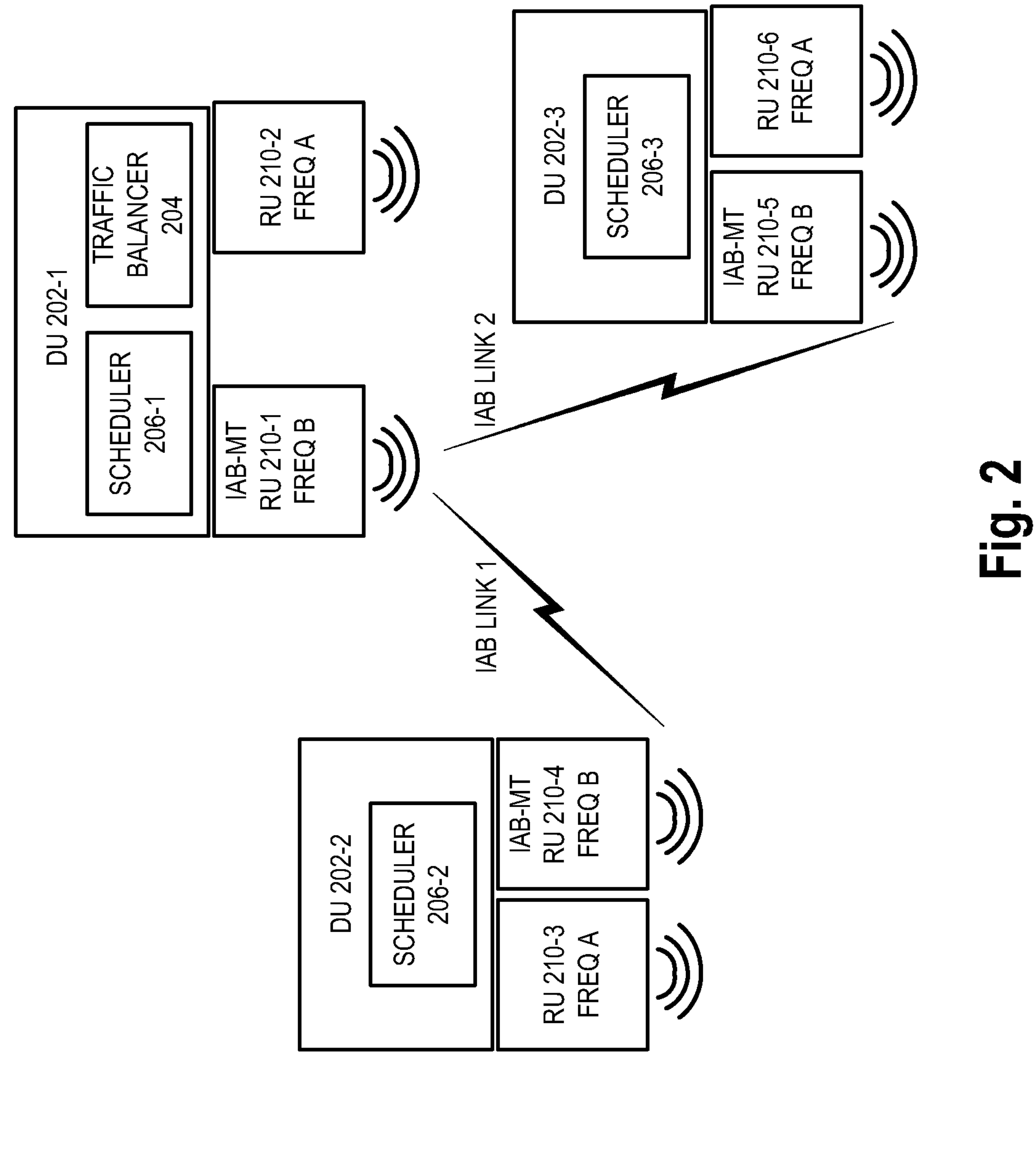
FIG. 2 is a diagram illustrating another exemplary environment in which an exemplary embodiment of the IAB backhaul sharing among co-located radio sites service may be implemented.

FIG. 2 is a diagram illustrating another exemplary environment 200 in which an exemplary embodiment of the IAB backhaul sharing among co-located radio sites service may be implemented. As illustrated, exemplary environment 200 may include DUs 202-1 through 202-3 (also referred to collectively as DUs 202 and individually or generally as DU 202) and RUs 210-1 through 210-6 (also referred to collectively as RUs 210 and individually or generally as RU 210). As further illustrated, DU 202-1 may include a traffic balancer 204. Environment 200 may further include schedulers 206-1 through 206-3 (also referred to collectively as schedulers 206 and individually or generally as scheduler 206), in which each DU 202 may include scheduler 206.

According to an exemplary embodiment, environment 200 provides the IAB backhaul sharing among co-located radio sites in which the radio sites (e.g., an IAB device (e.g., IAB node, IAB donor DU, IAB donor node) and a wireless station (e.g., RU 210, DU 202, etc.)) are co-located and the scheduling is integrated (versus not integrated as described herein) among multiple frequencies, such as Frequency (Freq) A and Frequency (Freq) B. IAB link 1 and IAB link 2 are also shown as wireless links (e.g., IAB backhaul access links) that communicatively couple the co-located radio sites with one another.

DU 202 may include a type of access device 107 that may provide baseband processing and radio frequency (RF) functions, for example. DU 202 may support the lower layers of a protocol stack, such as a physical layer, a media access control (MAC), and a radio link control (RLC) layer. DU 202 may provide a function and/or a service associated with a split architecture that may be defined or specified by a standards body, such as Third Generation Partnership Project (3GPP), 3GPP2, International Telecommunication Union (ITU), European Telecommunications Standards Institute (ETSI), Global System Mobile Association (GSMA), and the like. DU 202 may provide other functions and/or services, as described herein. For example, DU 202 may provide a traffic balancing service, a scheduling service, or both, as described herein.

Traffic balancer 204 may include logic that provides a traffic balancing service of the IAB backhaul sharing among co-located radio sites service, as described herein. According to an exemplary embodiment, traffic balancer 204 may calculate a maximum access bandwidth for each IAB device or co-located radio sites relating to use of the IAB backhaul links, as described herein. For example, traffic balancer 204 may calculate the maximum access bandwidth based on an access capacity demand associated with each IAB device or co-located radio sites and an IAB link bandwidth associated with each IAB device or co-located radio sites.

Scheduler 206 may include logic that provides a scheduling service of the IAB backhaul sharing among co-located radio sites service, as described herein. Scheduler 206 may calculate local scheduling for access and use of the IAB backhaul by an IAB device or co-located radio sites. According to an exemplary embodiment, scheduler 206 may calculate a joint schedule (e.g., involving two or more frequencies bands or cells associated with RUs 210 at or of the IAB device or co-located radio sites) versus an independent scheduler for each frequency band or radio at or of the IAB device or the co-located radio sites. Scheduler 206 may calculate the joint schedule based on a total bandwidth demand and an allotted maximum access bandwidth provided by the traffic balancing service. The scheduler may further reconfigure a first allocation of bandwidth pertaining to the IAB backhaul associated with users of a first frequency band or cell to a second allocation of bandwidth pertaining to the IAB backhaul associated with users of a second frequency band or cell based on the relative values between the total bandwidth demand and the allotted maximum access bandwidth, as described herein.

RU 210 may include a type of access device 107 that converts radio signals to and from an antenna into a digital signal. RU 210 may provide digital front end (DFE) functions, support a lower physical layer, as well as other radio techniques, such as beamforming, etc. As illustrated, according to exemplary environment 200, at each DU 202, RU 210 may support a Freq A or a Freq B. According to an exemplary embodiment, Freq A and Freq B are different. Freq A may be implemented as a low, mid, high, or another portion of the radio spectrum. Freq B may be implemented in the mmWave, above mmWave, or another portion of the radio spectrum. As illustrated, RU 210-1, 210-4, and 210-5 may each be associated with an IAB device, as described herein. In contrast, RU 210-2, RU 210-3, and RU 210-6 may be associated with a non-IAB device (e.g., gNB, etc.), for example. As illustrated, RU 210-1 and RU 210-2 may be co-located radio sites. DU 202 may also be co-located with RUs 210.

Although FIG. 2 illustrates environment 200 with exemplary network devices and communication links, according to other exemplary embodiments, the number and arrangement of network devices and communication links may be different. According to an exemplary embodiment, DU 202-1 may be implemented as a part of an IAB donor DU device or the like. Although not illustrated, the IAB donor DU device may be integrated with or split from a CU to form an IAB donor device, which may connect to backhaul network 110. Additionally, according to other exemplary embodiments, the number of frequencies at each co-located radio site may be greater than two.

Figure 3:
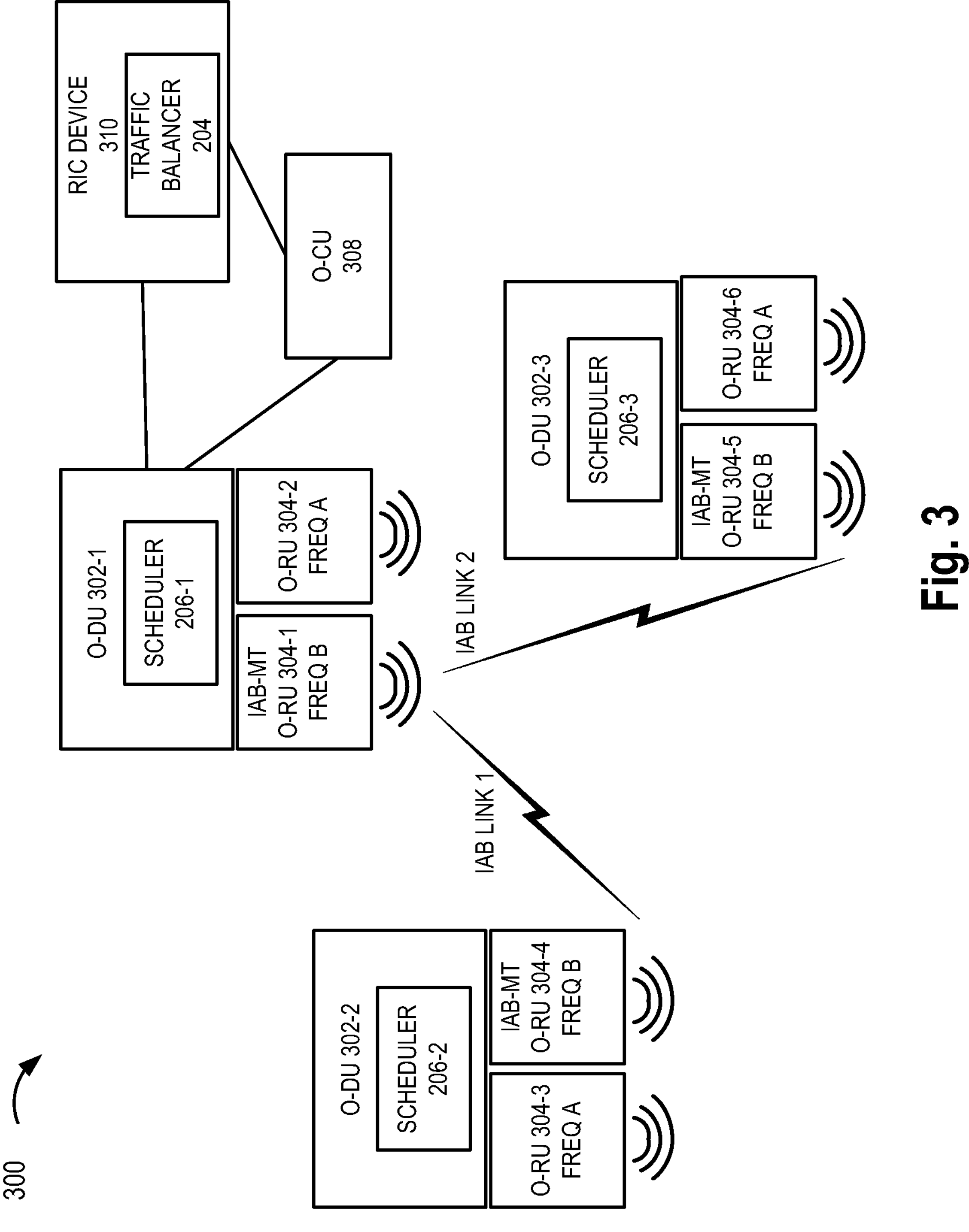
FIG. 3 is a diagram illustrating yet another exemplary environment in which an exemplary embodiment of the IAB backhaul sharing among co-located radio sites service may be implemented.

FIG. 3 is a diagram illustrating yet another exemplary environment 300 in which an exemplary embodiment of the IAB backhaul sharing among co-located radio sites service may be implemented. As illustrated, exemplary environment 300 may include O-DUs 302-1 through 302-3 (also referred to collectively as O-DUs 302 and individually or generally as O-DU 302) and O-RUs 304-1 through O-RU 304-6 (also referred to collectively as O-RUs 304 and individually or generally as O-RU 304). As further illustrated, each O-DU 302 may include scheduler 206. Environment 300 may further include an O-CU 308 and a RIC device 310. RIC device 310 may include traffic balancer 204. In view of the O-RAN standard, O-DU 302 and O-RU 304 may perform similar functions and/or provide similar services as DU 202 and RU 210, as previously described. IAB link 1 and IAB link 2 are also shown as wireless links (e.g., IAB backhaul links) that communicatively couple the co-located radio sites with one another.

O-CU 308 may include a type of access device 107 that provides partial layer 2 functionality (e.g., Packet Data Convergence Protocol (PDCP) and Service Data Adaptation Protocol (SDAP)), and layer 3 functionality (e.g., Radio Resource Control (RRC)). O-CU 308 may include an O-CU-CP and an O-CU-UP (not illustrated) that provide control plane and user plane services.

RIC device 310 may provide intelligent radio resource management, QoS management, connectivity management, and handover management in a RAN. For example, RIC device 310 may control and optimize various radio resources, such as the selection of radio access devices (e.g., eNB, CU, gNB), etc.) associated with a 4G, 5G, or future RAN. RIC device 310 may support (near)-real-time intelligent radio resource management. For example, RIC device 310 may control and optimize various radio resources of radio access devices (e.g., eNB, RU, RRH, gNB, DU, etc.) associated with a 4G, 5G, or future RAN, radio resource scheduling for uplink and downlink communication with end device 130, and radio signal characteristics (e.g., modulation, beam management, etc.). RIC device 310 may support non-real-time intelligent radio resource management, higher layer procedure optimization, and policy optimization in a RAN.

According to an exemplary embodiment, RIC device 310 may include logic of an exemplary embodiment of the IAB backhaul sharing among co-located radio sites service, as described herein. For example, as mentioned above, RIC device 310 may include traffic balancer 204, which contrasts with environment 200, wherein traffic balancer 204 is situated in DU 202-1. Traffic balancer 204 may provide traffic balancing services, as described herein.

Although FIG. 3 illustrates environment 300 with exemplary network devices and communication links, according to other exemplary embodiments, the number and arrangement of network devices and communication links may be different. According to an exemplary embodiment, O-DU 302-1 may be implemented as a part of an IAB donor device or the like. Additionally, according to other exemplary embodiments, the number of frequencies at each co-located radio site may be greater than two.

Figure 4:
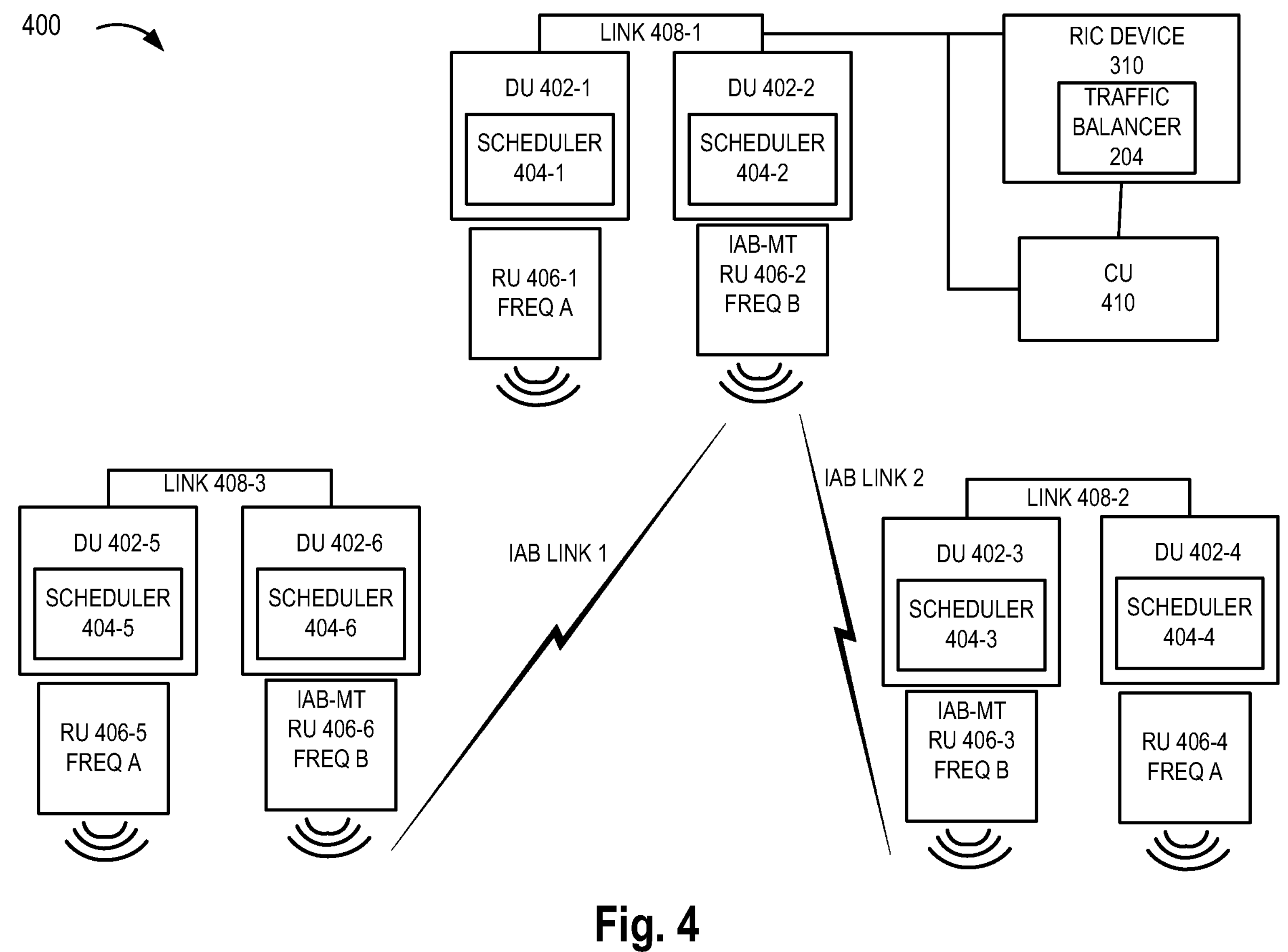
FIG. 4 is a diagram illustrating still another exemplary environment in which an exemplary embodiment of the IAB backhaul sharing among co-located radio sites service may be implemented.

FIG. 4 is a diagram illustrating still another exemplary environment 400 in which an exemplary embodiment of the IAB backhaul sharing among co-located radio sites service may be implemented. As illustrated, exemplary environment 400 may include DUs 402-1 through 402-3 (also referred to collectively as DUs 402 and individually or generally as DU 402) and RUs 406-1 through RU 406-6 (also referred to collectively as RUs 406 and individually or generally as RU 406). Additionally, as illustrated, DUs 402 may be connected to each other via links 408-1, 408-2, and 408-3 (referred to collectively as link 408, and individually or generally as link 408). IAB link 1 and IAB link 2 are also shown as wireless links (e.g., IAB backhaul links) that communicatively couple the co-located radio sites with one another.

DU 402 and RU 406 may operate similarly to DU 202 and RU 210. However, in contrast to environments 200 and 300, schedulers 404-1 through 404-6 (referred to collectively as schedulers 404 and individually or generally as scheduler 404) may not be integrated but separate or not integrated relative to each frequency band or cell, for example. For example, as further illustrated, each DU 402 may include scheduler 404 and be associated with RU 406 (e.g., a radio site). Environment 400 may include RIC device 310 and traffic balancer 204, as previously described, and a CU 410. While not an O-RAN device, for purposes of description, CU 410 may perform similar functions and/or services as those described in relation to O-CU 308.

Scheduler 404 may provide the scheduling service in a manner similar to that of scheduler 206 except that each scheduler 404 of a co-located radio site may calculate a schedule for its respective radio site. For example, scheduler 404-1 may calculate a schedule pertaining to users of RU 406-1 and scheduler 404-2 may calculate a scheduler pertaining to users of RU 406-2. Additionally, scheduler 404-1 or scheduler 404-2 may communicate their respective schedule via link 408-1 to the other scheduler 404 (e.g., scheduler 404-1 or scheduler 404-2). According to exemplary embodiment, scheduler 404-1 or scheduler 404-2 may calculate a joint or integrated schedule based on receipt of the scheduler from the other scheduler 404 and their own calculated schedule.

Figure 5:
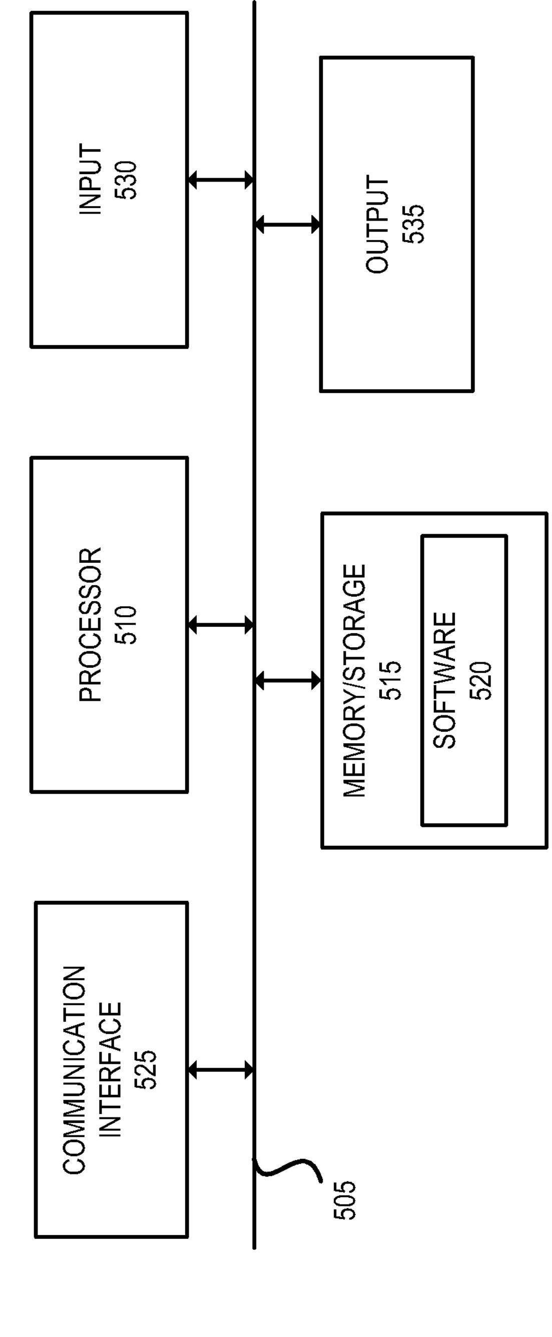
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to access device 107, external device 117, core device 122, end device 130, DU 202, RU 210, O-DU 302, O-RU 304, O-CU 308, RIC device 310, CU 410, and/or other types of devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 515 may be external to and/or removable from device 500, such as, for example, a Universal Serial Bus (USB) memory stick, a dongle, a hard disk, mass storage, off-line storage, or some other type of storing medium. Memory/storage 515 may store data, software, and/or instructions related to the operation of device 500.

Software 520 includes an application or a program that provides a function and/or a process. As an example, with reference to access device 107, software 520 may include an application that, when executed by processor 510, provides a function and/or a process of the IAB backhaul sharing among co-located radio sites service, as described herein. Software 520 may also include firmware, middleware, microcode, hardware description language (HDL), and/or another form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces, optical interfaces, and/or wired interfaces. For example, communication interface 525 may include one or multiple transmitters and receivers, or transceivers. Communication interface 525 may operate according to a protocol stack and a communication standard. Communication interface 525 may support one or multiple MIMO, beamforming, and/or transmission/reception configurations.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 500 may be implemented in the same manner. For example, device 500 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 500 may be configured to perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515, when executed, may cause or configure processor 510 to perform a function or a process, as described herein. Alternatively, for example, according to other implementations, device 500 may be configured to perform a function or a process described herein based on the execution of hardware (processor 510, etc.).

Figure 6:
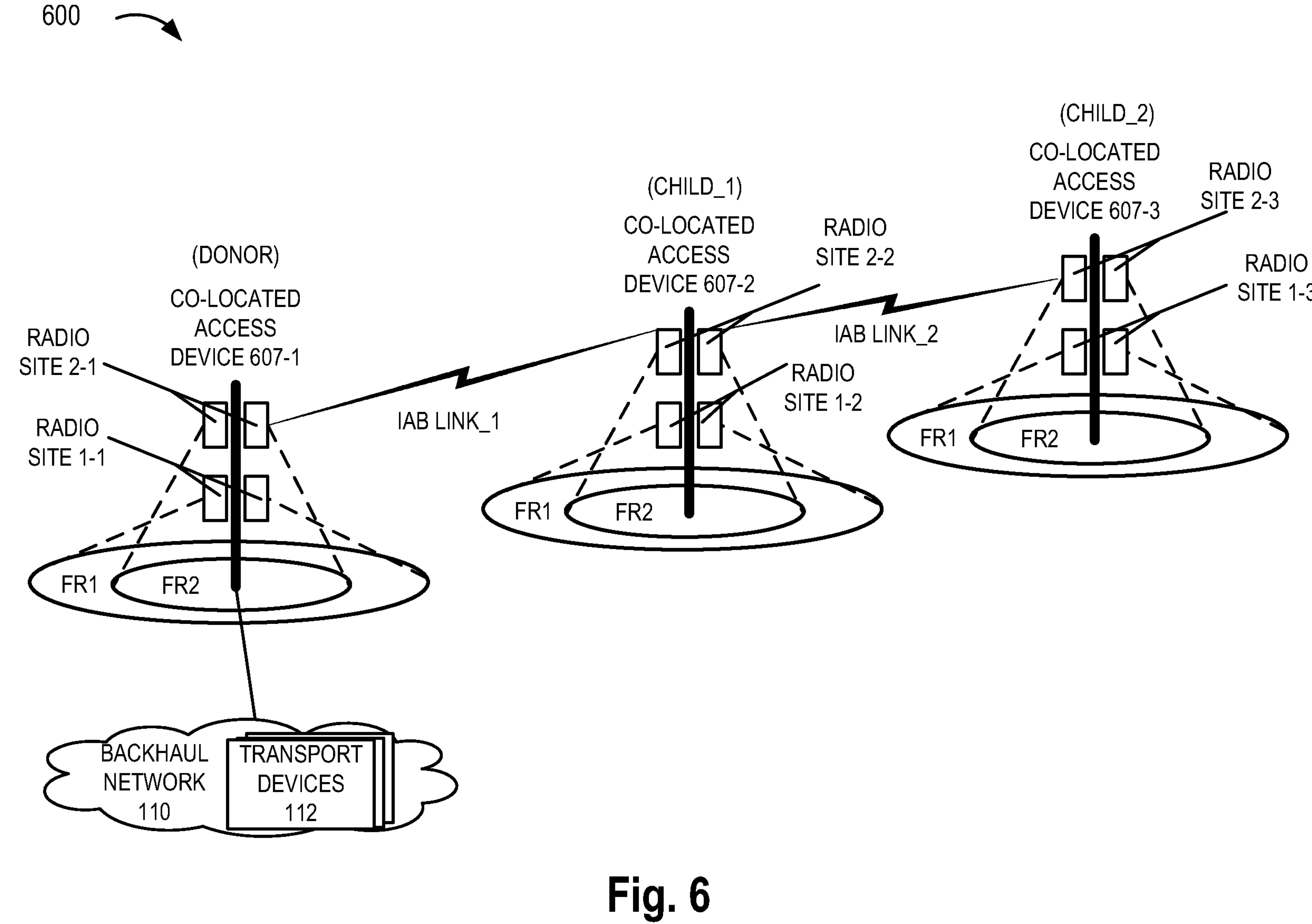
FIG. 6 is a diagram illustrating still another exemplary environment in which an exemplary embodiment of the IAB backhaul sharing among co-located radio sites service may be implemented.

FIG. 6 is a diagram illustrating still another exemplary environment 600 in which an exemplary embodiment of the IAB backhaul sharing among co-located radio sites service may be implemented. As illustrated, environment 600 includes co-located access devices 607-1 through 607-3 (also referred to collectively as co-located access devices 607 and individually or generally as co-located access device 607). Co-located access device 607 may include multiple radio sites. For example, as illustrated, co-located access device 607 may include a radio site 1 that supports a frequency 1 (FR1) and a radio site 2 that supports a frequency 2 (FR2). The number of co-located access devices 607 and radio sites at each co-located access device 607 are exemplary. As described herein, the number of frequencies, frequency bands, carriers, or the like at each co-located access device 607 may be more than two. Additionally, as described for access device 107, co-located access device 607 may support various radio spectrum (e.g., low band, mid band, high band, mmWave, above mmWave, cm wave, etc.) for connectivity to end device 130 (not illustrated), for IAB links, and so forth. The topology of co-located access devices 607 is also exemplary. According to other exemplary embodiments, the topology may include two or more IAB links connected to one or multiple co-located access devices 607.

As further illustrated, co-located access devices 607 may be communicatively coupled via an IAB link 1 and an IAB link 2. For example, radio site 2 at each co-located access device 607 may be associated with an IAB device. By way of further example, co-located access device 607-1 may be an IAB donor DU/RU device and co-located access devices 607-2 and 607-3 may each be an IAB DU/RU device or child (e.g., Child 1 and Child 2). IAB link 1 and IAB link 2 and co-located access devices 607 may be considered an (IAB) network path to and from backhaul network 110. Although not illustrated, each co-located access device 607 may include a scheduler device (e.g., scheduler 206). Additionally, although not illustrated, environment 600 may include a traffic balancing device. According to some exemplary embodiments, co-located access device 607-1 may include a traffic balancing device (e.g., traffic balancer 204) or the traffic balancing device (e.g., traffic balancer 204) may be included in RIC device 310 or the like, for example.

The allocation of a maximum bandwidth for an IAB link is constrained by the bandwidth capacity of the IAB link. For example, assume the bandwidth for IAB link 1 is BW1. IAB link 1 may support the user traffic for all IAB devices, such as Child 1 and Child 2. Also assume that the access link bandwidth for Child 1 and Child 2 are BW Child 1 and BW Child 2. For the sake of simplicity, assume that overhead is ignored, the access link bandwidth allocation should satisfy the following exemplary condition or expression:

$$BW1 \geq BW \text{ Child } 1 + BW \text{ Child } 2 \tag{1}$$

Figure 7:
FIG. 7 is a flow diagram illustrating an exemplary process of an exemplary embodiment of the IAB backhaul sharing among co-located radio sites service.
Figure 7:
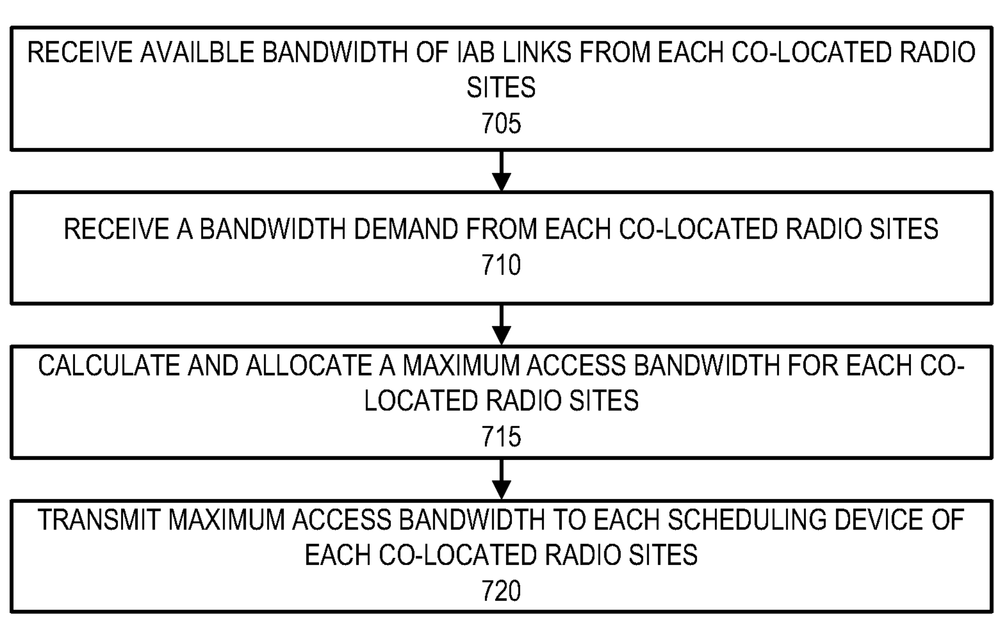

FIG. 7 is a flow diagram illustrating an exemplary process 700 of an exemplary embodiment of the IAB backhaul sharing among co-located radio sites service. According to an exemplary embodiment, access device 107 may perform process 700. For example, access device 107 may be implemented as a RIC device, such as RIC device 310 or similar RAN controller device, or an IAB donor DU device or an IAB donor device that may provide the traffic balancing services of the IAB backhaul sharing among co-located radio sites service, as described herein. According to an exemplary implementation, processor 510 executes software 520 to perform a step (in whole or in part) of process 500, as described herein. Alternatively, a step (in whole or in part) may be performed by the execution of only hardware.

For purposes of description in relation to process 700, the RIC device, the IAB donor DU device, and/or the like is/are referred to as traffic balancing device. Additionally, for the purposes of description, reference is made to FIGS. 2, 3, and 6.

Referring to FIG. 7, in block 705, the traffic balancing device may receive available bandwidth of IAB link from each co-located radio sites. For example, the traffic balancing device (e.g., traffic balancer 204) may receive an available IAB link bandwidth value regarding an IAB link from the scheduling device (e.g., scheduler 206, scheduler 404, schedulers of co-located access devices 607). According to an exemplary embodiment, the scheduling device may provide a scheduling service (in an integrated manner) in relation to two or more radio frequencies, frequency bands, carriers, cells, etc., of the co-located radio sites, as described herein. According to another exemplary embodiment, the scheduling device may provide a scheduling service (in a non-integrated manner, such as scheduler 404). The available IAB link bandwidth value may indicate a total bandwidth or a capacity value. The available IAB link bandwidth value may include a current value and/or a prospective value.

In block 710, the traffic balancing device may receive a bandwidth demand from each co-located radio sites. For example, the traffic balancing device may receive a bandwidth demand value from the scheduling device of co-located access devices 607 (e.g., IAB donor DU, Child 1, Child 2), DU 202 and RU 210, O-DU 302 and O-RU 304, DU 402 and RU 406, and so forth.

In block 715, the traffic balancing device may calculate and allocate the maximum access bandwidth for each co-located radio sites. For example, the traffic balancing device may calculate and allocate a maximum access bandwidth value based on the available IAB link bandwidth value and the bandwidth demand value for each co-located radio sites, as well as expression (1), as described herein. The traffic balancing device may calculate the allotted maximum access bandwidth value for each co-located radio sites based on other types of criteria, such as node efficiency, cluster efficiency, co-located radio sites bandwidth history, IAB topology, and/or other factors (e.g., network policies relating to user traffic priority, access fairness, etc.). Referring to FIG. 6, the allotted maximum access bandwidth value associated with each co-located radio sites (e.g., co-located radio sites 607-1, 607-2, and 607-3) may be a portion of the IAB backhaul (e.g., IAB link 1 and IAB link 2 or child 2 to donor) that is shared by multiple co-located radio sites of a network path (e.g., child 2 to donor) to backhaul network 110 in the upstream direction or a network path (e.g., donor to child 2) from backhaul network 110 in the downstream direction, for example.

In block 720, the traffic balancing device may transmit the maximum access bandwidth allocated to each scheduling device. For example, the traffic balancing device may transmit an allotted maximum access bandwidth value, which may be different between different co-located radio sites, to the scheduling device of each co-located radio sites.

FIG. 7 illustrates an exemplary process 700 of the IAB backhaul sharing among co-located radio sites service, however, according to other exemplary embodiments, the IAB backhaul sharing among co-located radio sites service may perform additional operations, fewer operations, and/or different operations than those illustrated and described in relation to FIG. 7. For example, the traffic balancing device may perform additional and/or different operations or steps as described elsewhere in this description.

Figure 8:
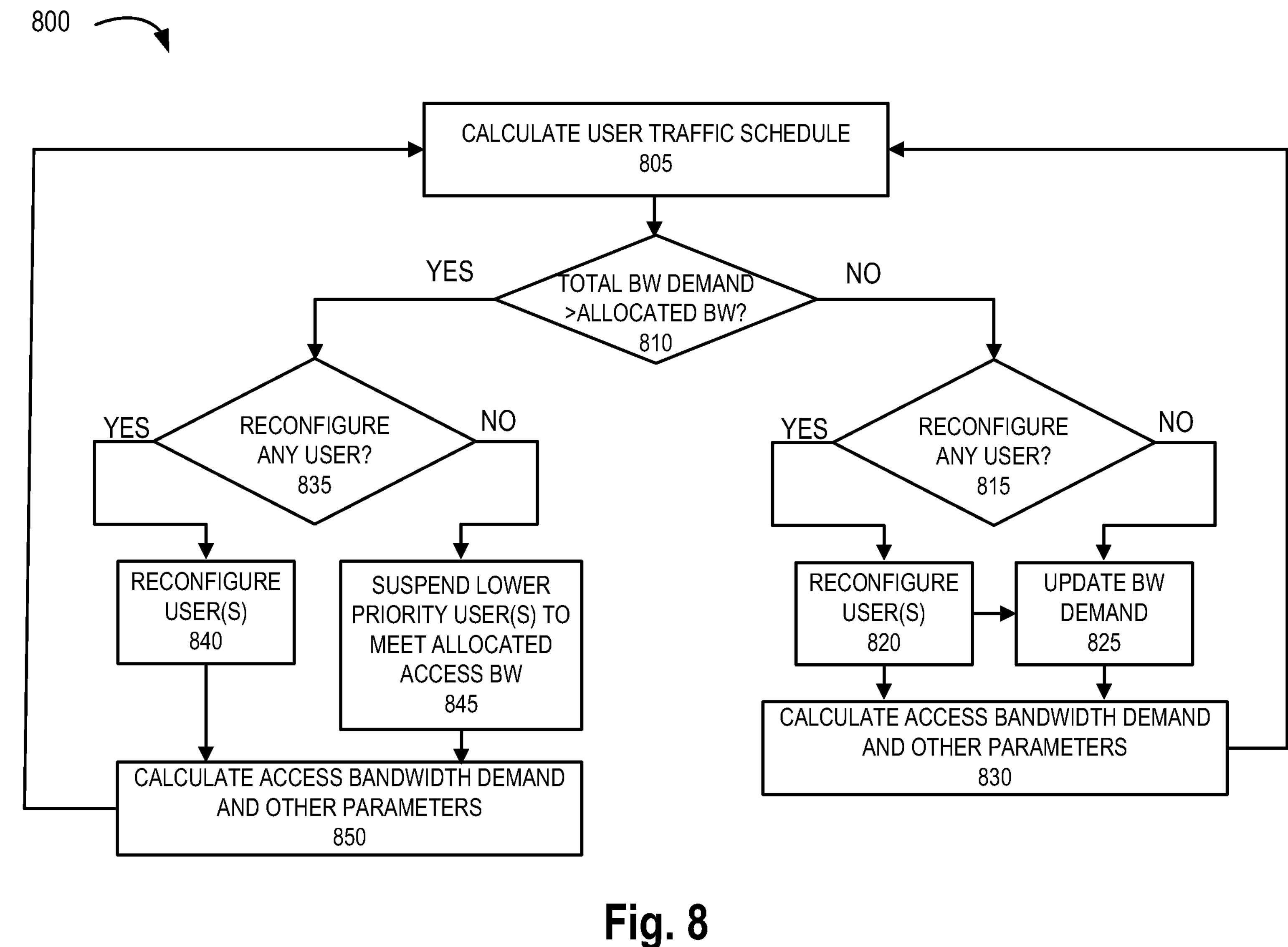
FIG. 8 is a flow diagram illustrating another exemplary process of an exemplary embodiment of the IAB backhaul sharing among co-located radio sites service.

FIG. 8 is a flow diagram illustrating an exemplary process 800 of an exemplary embodiment of the IAB backhaul sharing among co-located radio sites service. According to an exemplary embodiment, access device 107 may perform process 800. For example, access device 107 may be implemented as a wireless station, such as an eNB, an eLTE eNB, a gNB, a DU device, a DU and RU device, an IAB device, or the like, which includes a scheduler that provides the scheduling service, as described herein. According to an exemplary implementation, processor 510 executes software 520 to perform a step (in whole or in part) of process 800, as described herein. Alternatively, a step (in whole or in part) may be performed by the execution of only hardware. For purposes of description, process 800 is described as being performed by a scheduling device.

Referring to FIG. 8, in block 805, the scheduling device may calculate a traffic schedule for user traffic associated with multiple frequency bands or cell of a co-located radio site. The scheduling device may evaluate respective users buffer size, SLA or QoS, and queueing history associated with each radio site and set of users.

In block 810, the scheduling device may determine whether the total bandwidth demand is greater than the allocated bandwidth. For example, the scheduling device may compare the total access bandwidth demand to the allotted maximum access bandwidth provided by the traffic balancer.

When the total bandwidth demand is not greater than the allocated bandwidth (block 810-NO), the scheduling device may determine whether to reconfigure any user (block 815). For example, when there is excess IAB backhaul bandwidth, the scheduling device may increase an allotment of the maximum access bandwidth to a set of users or a user. By way of example, referring to FIG. 6, if an FR1 user (e.g., a sub-6 GHz user) is situated in an FR2 cell (e.g., a mmWave cell) (as well as the FR1 cell), the scheduling device may increase or upgrade the allotment of IAB backhaul bandwidth to such FR1 user. Thus, as illustrated in FIG. 8, in block 820, the scheduling device may reconfigure the user. Depending on whether there is any remaining excess bandwidth, process 800 may proceed from block 820 to block 825, or proceed from block 820 to block 825.

When the scheduling device determines that there are no users that may be reconfigured (block 815-NO), the scheduling device may update the bandwidth demand (block 825). For example, the scheduling device may inform the traffic balancer with an updated access capacity demand. In this way, the traffic balancer may assign any excess bandwidth to another co-located radio sites or IAB device. As further illustrated, from blocks 820 and 825, the scheduling device may calculate an access bandwidth demand and other parameters, in block 830. The other parameters may include SLA requirement of a user, buffer size, queueing history, and other parameters, as described herein.

Referring back to block 810, when the total bandwidth demand is greater than the allocated maximum access bandwidth (block 810—YES), the scheduling device may determine whether any user may be reconfigured (block 835). For example, when there is insufficient IAB backhaul bandwidth, the scheduling device may decrease or downgrade an allotment of the maximum access bandwidth to a set of users or a user. By way of example, referring to FIG. 6, if an FR2 user (e.g., a mmWave user) is situated in an FR1 cell (e.g., a sub-6 GHz cell), the scheduling device may decrease the allotment of IAB backhaul bandwidth to such FR2 user. Thus, as illustrated in FIG. 8, in block 840, the scheduling device may reconfigure the user. When the scheduling device determines that the user may not be reconfigured (block 835-NO), the scheduling device may suspend lower priority users to meet the allocated access bandwidth (block 845). For example, the scheduling device may determine or identify gradations of priority among users based on SLA requirements, queueing history (e.g., a user has been scheduled more often than another user, or a user has been scheduled less often than another user), subscription information pertaining to the user/end device 130, and/or other configurable factors.

As further illustrated, at blocks 840 and 845, process 800 may continue to block 850 in which the scheduling device may calculate the access bandwidth demand and other parameters. The other parameters may include SLA requirement of a user, buffer size, queueing history, and other parameters, as described herein. Process 800 may continue to block 805.

FIG. 8 illustrates an exemplary process of the IAB backhaul sharing among co-located radio sites service, however, according to other exemplary embodiments, the IAB backhaul sharing among co-located radio sites service may perform additional operations, fewer operations, and/or different operations than those illustrated and described in relation to FIG. 8. For example, the scheduling device may perform additional and/or different operations as described elsewhere in this description.

Figure 9:
FIG. 9 is a flow diagram illustrating still another exemplary process of an exemplary embodiment of the IAB backhaul sharing among co-located radio sites service.
Figure 9:
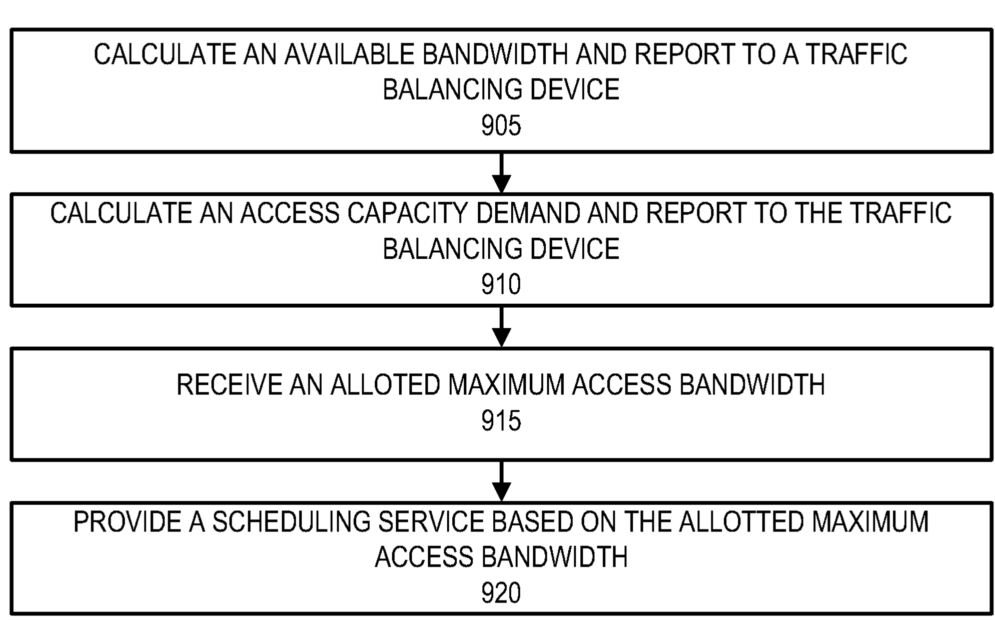

FIG. 9 is a flow diagram illustrating an exemplary process 900 of an exemplary embodiment of the IAB backhaul sharing among co-located radio sites service. According to an exemplary embodiment, access device 107 may perform process 900. For example, access device 107 may be implemented as a wireless station, such as an eNB, an eLTE eNB, a gNB, a DU device, a DU and RU device, or the like. According to an exemplary implementation, processor 510 executes software 520 to perform a step (in whole or in part) of process 800, as described herein. Alternatively, a step (in whole or in part) may be performed by the execution of only hardware. For purposes of description in relation to process 900, the wireless station is referred to as a scheduling device.

In block 905, the scheduling device may calculate an available bandwidth and report to a traffic balancing device. For example, the scheduling device (e.g., scheduler 206, scheduler 404, etc.) may calculate a current and/or prospective available IAB link bandwidth value. The available IAB link bandwidth value may be a dynamic value over time based on varying RF conditions and/or other known factors. The scheduling device may transmit the current and/or prospective available IAB link bandwidth value to traffic balancer 204.

In block 910, the scheduling device may calculate access capacity demand and report to the traffic balancing device. For example, the scheduling device (e.g., scheduler 206, scheduler 404, etc.) may calculate a current and/or prospective access demand value, and transmit the access demand value to traffic balancer 204. The scheduling device may calculate the current and/or prospective access demand value based on various criteria, such as the number of users being serviced, the number of connections served by the co-located radio sites (e.g., FR1 connections, FR2 connections, etc.), current RF conditions, spectral efficiency, and/or other types of criteria (e.g., end device 130 mobility, user priority, user traffic characteristics (e.g., bursty, periodic, aperiodic, continuous, amount of data, length of time pertaining to a transmission or a reception of data, etc.).

In block 915, the scheduling device may receive an allotted maximum access bandwidth. For example, responsive to a transmission of the available and/or prospective IAB link bandwidth value and the current and/or prospective access demand value, the scheduling device (e.g., scheduler 206, scheduler 404, etc.) may receive from traffic balancer 204 an allotted maximum access bandwidth value.

In block 920, the scheduling device may provide a scheduling service based on the allotted maximum access bandwidth. For example, as illustrated and described in relation to FIG. 8, the scheduling device (e.g., scheduler 206, scheduler 404, etc.) may perform the scheduling service. The scheduling device may also provide the scheduling service based on other criteria, such as users buffer size, load balancing between different frequency bands, and/or other types of metrics (e.g., user traffic priority, etc.).

FIG. 9 illustrates an exemplary process of the IAB backhaul sharing among co-located radio sites service, however, according to other exemplary embodiments, the IAB backhaul sharing among co-located radio sites service may perform additional operations, fewer operations, and/or different operations than those illustrated and described in relation to FIG. 9. For example, the scheduling device may perform additional and/or different operations as described elsewhere in this description.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 7, 8, and 9, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:

calculating, by a radio access network (RAN) device of co-located radio sites, a bandwidth demand value pertaining to user traffic of the co-located radio sites and an integrated access and backhaul (IAB) backhaul, wherein the RAN device is downstream from an IAB donor device or a radio intelligent controller (RIC) device;

calculating, by the RAN device, an integrated schedule for the user traffic relating to the IAB backhaul and frequency bands of the co-located radio sites;

receiving, by the RAN device from the IAB donor device or the RIC device, an allotted maximum bandwidth value regarding the IAB backhaul;

comparing, by the RAN device, the bandwidth demand value to the allotted maximum bandwidth value; and reconfiguring, by the RAN device in response to a result of the comparing, the integrated schedule including modifying a first allotment of bandwidth of a first user associated with a first radio and a first frequency band of the frequency bands of the co-located radio sites to a second allotment of bandwidth of a second user associated with a second radio and a second frequency band of the frequency bands of the co-located radio sites based on service level requirements, which include user priority, associated with the first user and the second user, and queuing history associated with the first user and the second user.

2. The method of claim 1, wherein the allotted maximum bandwidth value relates to a portion of an IAB backhaul bandwidth that is shared by multiple co-located radio sites of a network path, which includes the co-located radio sites, to a backhaul network.

3. The method of claim 1, wherein the result of the comparing includes that the bandwidth demand value is above or below the allotted maximum bandwidth value.

4. The method of claim 1, wherein the co-located radio sites include at least one radio site of an IAB device and at least one radio site of next generation Node B.

5. The method of claim 1, further comprising:

calculating, by the RAN device, an available bandwidth value pertaining to an IAB link of the IAB backhaul; and transmitting, by the RAN device to the IAB donor device or the RIC device device, the available bandwidth value and the bandwidth demand value.

6. The method of claim 1, wherein the first radio relates to an IAB cell and the second radio relates to a non-IAB cell.

7. The method of claim 1, further comprising:

determining, by the RAN device, that the first allotment of bandwidth of the first user can be reconfigured based on a location of the first user relative to a common coverage area of the first radio and the second radio.

8. The method of claim 1, wherein the RAN device is a distributed unit (DU) device or an Open RAN (O-RAN) DU device.

9. One or more network devices comprising:

one or more processors that are configured to:

calculate a bandwidth demand value pertaining to user traffic of co-located radio sites and an integrated access and backhaul (IAB) backhaul, wherein the network device is a radio access network (RAN) device of the co-located radio sites and is downstream from an IAB donor device or a radio intelligent controller (RIC) device;

calculate an integrated schedule for the user traffic relating to the IAB backhaul and frequency bands of the co-located radio sites;

receive, from the IAB donor device or the RIC device, an allotted maximum bandwidth value regarding the IAB backhaul;

compare the bandwidth demand value to the allotted maximum bandwidth value; and reconfigure, in response to a result of the comparison, the integrated schedule including modifying a first allotment of bandwidth of a first user associated with a first radio and a first frequency band of the frequency bands of the co-located radio sites to a second allotment of bandwidth of a second user associated with a second radio and a second frequency band of the frequency bands of the co-located radio sites based on service level requirements, which include user priority, associated with the first user and the second user, and queuing history associated with the first user and the second user.

10. The one or more network devices of claim 9, wherein the allotted maximum bandwidth value relates to a portion of an IAB backhaul bandwidth that is shared by multiple co-located radio sites of a network path, which includes the co-located radio sites, to a backhaul network.

11. The one or more network devices of claim 9, wherein the result of the comparison includes that the bandwidth demand value is above or below the allotted maximum bandwidth value.

12. The one or more network devices of claim 9, wherein the one or more processors are further configured to:

calculate an available bandwidth value pertaining to an IAB link of the IAB backhaul; and transmit, to the IAB donor device or the RIC device, the available bandwidth value and the bandwidth demand value.

13. The one or more network devices of claim 9, wherein the co-located radio sites include at least one radio site of an IAB device and at least one radio site of next generation Node B.

14. The one or more network devices of claim 9, wherein the first radio relates to an IAB cell and the second radio relates to a non-IAB cell.

15. The one or more network devices of claim 9, wherein the one or more processors are further configured to:

determine that the first allotment of bandwidth of the first user can be reconfigured based on a location of the first user relative to a common coverage area of the first radio and the second radio.

16. The one or more network devices of claim 9, wherein the RAN device is a distributed unit (DU) device or an Open RAN (O-RAN) DU device.

17. A non-transitory computer-readable storage medium storing instructions executable by a processor of a radio access network (RAN) device of co-located radio sites, wherein the RAN device is downstream from an integrated access and backhaul (IAB) donor device or a radio intelligent controller (RIC) device, and wherein the instructions are configured to:

calculate a bandwidth demand value pertaining to user traffic of the co-located radio sites and an IAB backhaul;

calculate an integrated schedule for the user traffic relating to the IAB backhaul and frequency bands of the co-located radio sites;

receive, from the IAB donor device or the RIC device, an allotted maximum bandwidth value regarding the IAB backhaul;

compare the bandwidth demand value to the allotted maximum bandwidth value; and reconfigure, in response to a result of the comparison, the integrated schedule including modifying a first allotment of bandwidth of a first user associated with a first radio and a first frequency band of the frequency bands of the co-located radio sites to a second allotment of bandwidth of a second user associated with a second radio and a second frequency band of the frequency bands of the co-located radio sites based on service level requirements, which include user priority, associated with the first user and the second user, and queuing history associated with the first user and the second user.

18. The non-transitory computer-readable storage medium of claim 17, wherein the instructions are further configured to:

calculate an available bandwidth value pertaining to an IAB link of the IAB backhaul; and transmit, to the other RAN device, the available bandwidth value and the bandwidth demand value.

19. The non-transitory computer-readable storage medium of claim 17, wherein the instructions are further configured to:

determine that the first allotment of bandwidth of the first user can be reconfigured based on a location of the first user relative to a common coverage area of the first radio and the second radio.

20. The non-transitory computer-readable storage medium of claim 17, wherein the allotted maximum bandwidth value relates to a portion of an IAB backhaul bandwidth that is shared by multiple co-located radio sites of a network path, which includes the co-located radio sites, to a backhaul network.

* * * * *